United States Patent [19]

George

[11] 3,997,272

[45] Dec. 14, 1976

[54] MAGNETIC STIRRER IMPROVEMENT

[75] Inventor: Kenyon P. George, Los Altos, Calif.

[73] Assignee: Varian Associates, Palo Alto, Calif.

[22] Filed: Dec. 15, 1975

[21] Appl. No.: 640,816

[52] U.S. Cl. ........................ 356/246; 259/DIG. 46; 356/196

[51] Int. Cl.$^2$ ........................................ G01N 1/10

[58] Field of Search ................. 356/196, 197, 246; 259/DIG. 46

[56] References Cited

FOREIGN PATENTS OR APPLICATIONS 1,151,246 7/1963 Germany .................... 259/DIG. 46

*Primary Examiner*—John K. Corbin
*Assistant Examiner*—Matthew W. Koren
*Attorney, Agent, or Firm*—Stanley Z. Cole; Gerald M. Fisher; John J. Morrissey

[57] ABSTRACT

Improved magnetic stirring means for use with an optical absorption cell of the type characterized by a non-magnetic container for fluidic samples to be analyzed, which container has a rectangular cross-section of interior dimensions A × B, where A is relatively large compared with B. The stirrer comprises a magnetically responsive body positioned at the bottom of the container, for effecting agitation of the sample in response to a rotating magnetic field applied by field sources which rotate about a vertical axis beneath the container. The stirrer body is of generally cylindrical cross-section, of axial length slightly less than the dimension A, and of diameter slightly less than dimension B. The stirrer body is oriented with its axis in a horizontal plane, and thus its lateral periphery lies closely adjacent to the internal container walls. The body carries permanent magnet means toward one end thereof, which provide a pair of opposite magnetic poles displaced to alternate sides of the body axis. The externally applied rotating magnetic field, alternately attracts and repels the magnetic poles, and the body, by virtue of the constraints imposed by the cell walls, rotates about its horizontal axis. The body preferably carries surface portions which are parallel to the body axis, whereby rotation about said axis drives the surfaces through the sample, to promote the desired agitation. These surface portions may be defined at longitudinally extending notches formed into the cylinder.

9 Claims, 9 Drawing Figures

MAGNETIC STIRRER IMPROVEMENT

BACKGROUND OF INVENTION

This invention relates generally to optical absorption spectroscopy, and more specifically relates to the optical absorption cells utilized in such environments for containing the samples which are subjected to analysis.

In the practice of optical absorption spectroscopy, apparatus such as spectrophotometers are utilized, which include one or more optical paths in which sample or reference materials are inserted, in order that the light absorption characteristics of the materials may be evaluated. The materials to be thus analyzed are physically contained in an optical absorption cell, which typically comprises a small rectangular container, the opposed sides of which are relatively transparent to the wavelengths being utilized during analysis.

Depending upon the nature of the sample being analyzed, it is frequently required that agitation be provided within the absorption cell, in order to maintain a high degree of uniformity. A common arrangement that has been utilized in the past to enable such results incorporates so-called magnetic stirrers. According to this well-known arrangement, a magnetically responsive agitator is positioned at the bottom of the cell container, and is caused to rotate in synchronism with an externally applied rotating magnetic field. In a typical arrangement, the magnetic field may be provided by a bar magnet which is mounted beneath the cell, and rotates about a vertical axis, so that the magnetic poles of the bar magnet substantially rotate in horizontal planes. In this arrangement the magnetic stirring body is itself rotatable about a vertical axes, and includes magnetic poles displaced from its vertical axes so that the stirrer body rotates about its vertical axis in synchronism with the field.

Techniques and apparatus of the foregoing type, while completely adequate for those applications where the optical absorption cells are characterized by a substantially square internal cross-section, have been found to be relatively inacceptable in those instances where the internal cross-section of the cells depart from a square. In particular, there exist numerous instances in the present art, wherein cells of the type known in the art as "micro cells" are utilized for sample evaluation. These cells are characterized by an internal cross-section which remains rectangular, but wherein the first dimension A is much larger than the second dimension B. In these instances, it is either impractical to emplace or operate a magnetic stirring arrangement of the type heretofore discussed, i.e. wherein the stirring body is positioned at the cell bottom and rotates about its vertical axes. Or alternatively (if such a stirring body is indeed positionable and operable) the stirring action, i.e. the agitation of fluidic samples, is found to be inadequate, since only a very small portion of the cell contents are actually subjected to agitation.

In accordance with the foregoing, it may be regarded as an object of the present invention, to provide an improved magnetic stirring arrangement, which enables highly effective agitation of fluidic samples contained in cells of the micro-cell or semi-micro-cell type, i.e. in cells having interior dimensions A × B, where A is relatively large compared with B.

It is a further object of the invention, to provide an improved magnetic stirrer body, which may be placed in a micro or semi-micro absorption cell, which body enables highly effective agitation of the fluidic sample contained in such cell, and which body may be actuated by rotating field sources of the type heretofore conventionally utilized in the art.

SUMMARY OF INVENTION

Now in accordance with the present invention, the foregoing objects, and others as will become apparent in the course of the ensuing specification, are enabled through use in a micro-cell of a magnetic stirrer body of generally cylindrical cross-section, the major diameter of the cylinder being slightly less than the smaller internal dimension of the cell, and the axial length of the cylinder being slightly less than the larger internal dimension of said cell. The stirrer body is positioned at the bottom of the said cell, and thus oriented with its axis in a generally horizontal plane. The periphery of the body thereby lies closely adjacent to the internal walls of the container. The stirrer body carries permanent magnet means toward one axial end thereof. The magnet means, which may be in the form of a bar magnet, are oriented transverse to the cylinder axis to thus provide a pair of opposite magnetic poles towards poles towards opposite sides of the cylinder. In consequence the externally applied rotating magnetic field alternately attracts and repels the said magnetic poles of the stirrer body; and by virtue of the constraints imposed by the proximate cell walls, the body rotates about its horizontal axis. The body preferably carries surface portions which are parallel to the body axis thereof, whereby rotation about said axis drives the surfaces through the sample, to promote the desired agitation. These surface portions may be defined at longitudinally extending notches formed into the cylinder.

BRIEF DESCRIPTION OF DRAWINGS

The invention is diagrammatically illustrated by way of example in the drawings appended hereto, in which.

DESCRIPTION OF PREFERRED EMBODIMENT

Figure 1:
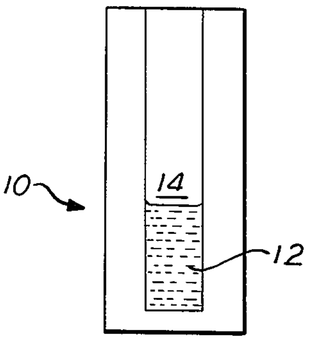
FIG. 1 is an elevational end view of a micro or semi-micro cell of the type utilized in the invention.
Figure 2:
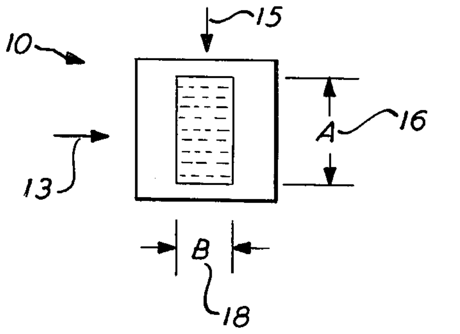
FIG. 2 is a top plan view of the FIG. 1 cell.

In FIGS. 1 and 2 herein, elevational and top plan views appear of an optical absorption cell 10 of the type utilized with the present invention. The cell 10 is per se conventional, and is of the type known in the art as a micro-cell or a semi-micro-cell. A fluidic sample 12 which is to be subjected to optical absorption spectroscopy is contained within the internal volume 14 of such cell. The present type of cell is characterized by a rectangular cross-section, which is highly elongated in one dimension. In particular a first dimension 16 of such cell typically has a magnitude A, which considerably exceeds the magnitude B of the second dimension 18. Thus in a typical instance the dimension A can be of the order of 10 to 20 mm, while the dimension B will be of the order of but 3 to 5 mm. Light may be rendered incident on such cell in either the directions 13 or 15. The particular problem imposed by this highly elongated cross-section is one wherein agitation of the fluidic sample can be effected only with the greatest difficulty. In particular, and as previously indicated, prior art magnetic stirring arrangements have simply been inadequate for such purposes.

Figure 3:
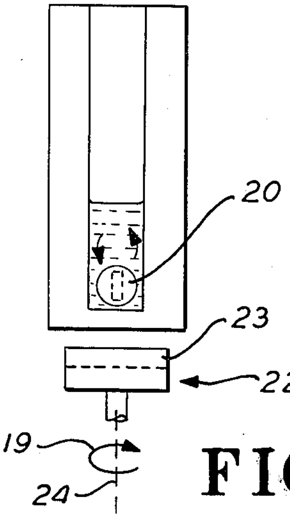
FIG. 3 is an elevational end view of the micro-cell of FIG. 1, showing the stirrer body of the invention in place and in the course of actuation by external magnetic field sources.
Figure 4:
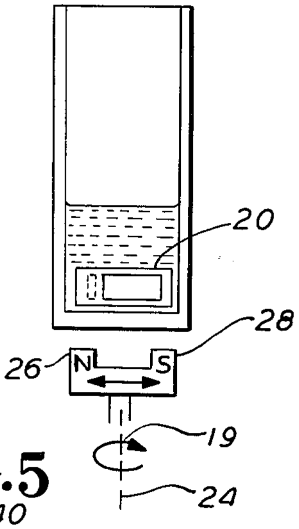
FIG. 4 is a right side elevational view of the FIG. 3 apparatus.
Figure 5:
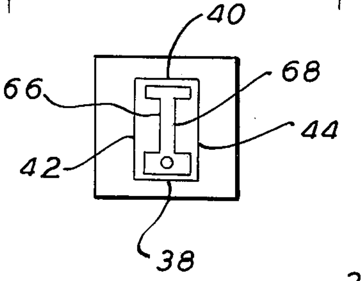
FIG. 5 is a top plan view of the FIG. 3 apparatus.

Referring to FIGS. 3 through 5, the cell 10 is shown in use with a magnetic stirrer body 20 in accordance with the present invention. The cell 10 is shown positioned above a conventional magnetic field source 22, which source establishes a rotating magnetic field which interacts with stirrer body 20, to effect rotation of same. The source 22 in the present instance is schematically shown as a simple bar magnet 23, which is rotatable e.g. in direction 19 about a vertical axis 24 by motor means not shown. Bar magnet 23 has at least a pair of opposite (N and S) magnetic poles 26 and 28, and thus it will be evident that rotation of bar magnet 23 about axis 24 effects rotation of these poles in substantially horizontal planes about the said vertical axis.

It, of course, will be evident that equivalent means may be utilized to establish the rotating magnetic field utilized in the present invention; i.e. other arrangement of magnetic poles may be utilized wherein the said poles are arranged to rotate about a vertical axis.

Figure 6:
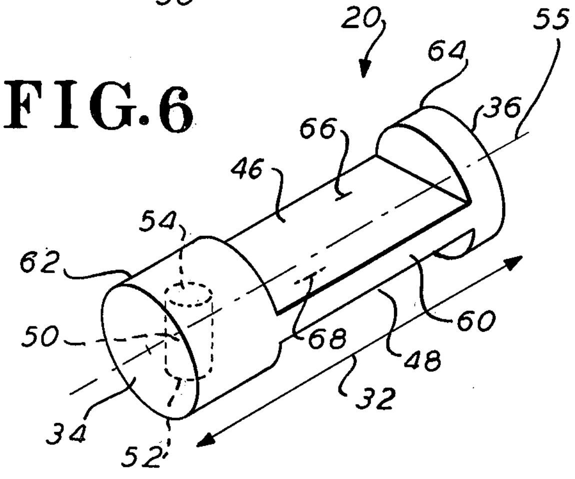
FIG. 6 is an enlarged perspective view of the stirrer body of the invention.
Figure 7:
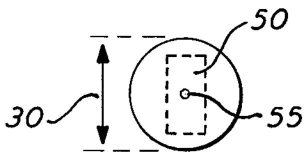
FIG. 7 is a left end view of the FIG. 6 device.

The stirring body 20 is positioned at the bottom of cell 10, as is apparent in all of FIGS. 3 through 5. As may perhaps be best seen from the enlarged views of FIGS. 6 and 7, the body is of a generally cylindrical form, the cylindrical portions thus having a diameter 30 which is slightly less than dimension B of FIGS. 1 and 2. Similarly, body 20 has an axial length 32, of magnitude slightly less than the dimension A heretofore mentioned. In consequence of such arrangement, it will be evident that body 20 when emplaced at the bottom of cell 10 resides with its end faces 34 and 36 closely adjacent the internal walls 38 and 40 of cell 10; and similarly it will be clear that the lateral periphery of the cylindrical portions lie closely adjacent walls 42 and 44 of the said cell.

While as previously indicated, the general shape of body 20 is cylindrical, cutout voids or notches 46 and 48 are formed at opposed lateral sides of the cylindrical body, which voids serve to define fluid agitation surfaces, which, as will become evident, are important in effecting agitation of the fluidic sample.

Toward one end of the body 20, viz. toward the face 34, a permanent magnet means is mounted or embedded into the said body, so that the magnet means, which may take the form of a simple bar magnet 50, provides opposed magnetic poles 52 and 54, which are disposed toward opposite sides of the cylinder axis 55. In the preferred form of the invention shown, the bar magnet 50 actually resides along a diameter of the cylinder so that poles 52 and 54 are displaced to alternate sides of the axis along such a diameter. The stirring body 20 comprises a non-magnetic material such as a molded plastic, e.g. of polytetrafluoroethylene (T.F.E.) or fluorinated ethylene-propylene (F.E.P.), with the former being preferred because of its higher degree of inertness to chemical attack. Since both body 20 and the material comprising cell 10 are non-magnetic, the magnet 50 may freely interact with the rotating field provided by source 22.

With the aid of the foregoing, the operation of the present device may now be comprehended. In particular it will be seen from FIGS. 3 through 5 that the stirring body 20 is, as mentioned, emplaced at the bottom of cell 10, and is thus oriented with its axis 55 extending substantially in the horizontal direction. As the rotating magnetic field provided by means 22 interacts with the magnet means 50 of stirring body 20, it will be clear that the successive presentation of poles 26 and 28 will alternately attract and repel the opposed poles 52 and 54 of magnet means 50. Since, however, the stirring body is restrained substantially against lateral movements by the closely adjacent walls 38, 40, 42 and 44, the net effect of the alternating attractive and repulsive forces acting on magnet means 50, is to effect a continuous unidirectional rotation of the stirring body about its own axis 55 — as the field source 22 rotates about its own vertical axis 24. Thus the rotation of field source 22 about the vertical axis 24 is converted by means of the present arrangement into rotary motion of stirring body 20 about a horizontal axis.

Since the said stirring body occupies substantially the entire bottom portion of cell 10, it wil be evident that rotation of this body will effect agitation of the fluidic sample on a gross scale. Similarly in this connection it will be evident that the provision of cutout voids 46 and 48 leaves a piece 68 between the fully cylindrical end portions 62 and 64, which piece effectively constitutes a flat plate which rotates about axis 55. The surfaces 66 and 68 of this plate thus act like paddles, i.e. they impinge directly against sample 12 as the body 20 rotates, thereby considerably increasing the effectiveness of the agitation provided by such body. It should be appreciated in this connection, that agitating surfaces performing a function similar to that of surfaces 66 and 68 can be provided in other fashion at body 20, e.g. the lateral surfaces of the cylinder can be ribbed or of a washboard configuration or so forth.

Figure 8:
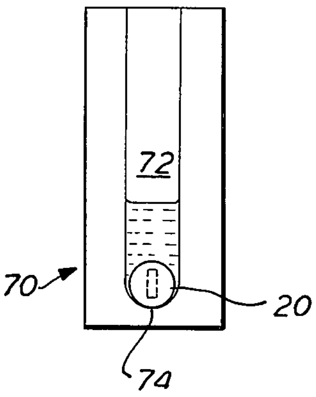
FIG. 8 is an elevational end view of a micro or semi-micro cell of an improved type offering further advantages in use with the present invention.
Figure 9:
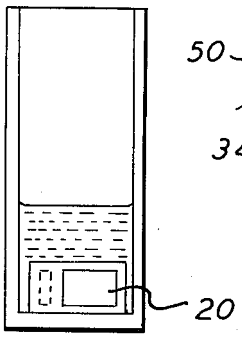
FIG. 9 is a right side elevational view of the FIG. 8 device.

In FIGS. 8 and 9 herein, a modified micro cell 70 is shown, which is particularly advantageous for use with the invention. The views of FIGS. 8 and 9 are in most respects similar to those of FIGS. 1 and 4 heretofore discussed. The principal distinction vis-a-vis the conventional cell 10 of these prior Figures, is that internal volume 72 of cell 70 is in part defined by a rounded bottom portion 74. In this instance, the said portion 74 thus defines a partial cylinder with a radius of curvature appropriate to approximately match the curvature of the periphery of stirring body 20. The consequence of this arrangement is that for a given incident light beam cross-section, the sample volume utilized is considerably reduced — in comparison to the sample volume required with the cell geometry of the prior Figures herein. This, in turn, improves the efficiency of stirring, since the mechanical mixing energy is dissipated in a comparatively reduced volume of liquid. It will of course be evident in FIGS. 8 and 9, that the stirring body 20 can be in accord with the construction e.g. of FIG. 6, or the body can include ribs or other agitating surfaces as discussed in the preceding paragraph.

While the present invention has been particularly set forth in terms of specific embodiments thereof, it will be understood in view of the present disclosure, that numerous variations upon the invention are now enabled to one skilled in the art, which variations yet reside within the scope of the present teaching. Accordingly the invention is to be broadly construed and limited only by the scope and spirit of the claims now appended hereto.

I claim:

1. In an optical absorption cell for use in optical absorption spectroscopy, said cell being characterized by a non-magnetic container for fluidic samples to be analyzed, said container having a generally rectangular transverse cross-section of interior dimensions A × B, where A is relatively large compared with B; and a magnetic stirrer body positioned at the bottom of said container for effecting agitation of said sample by responding to a rotating magnetic field externally applied by magnetic field sources rotating about a vertical axis beneath said container; the improvement wherein:

said magnetic stirrer body is of generally cylindrical cross-section, the major diameter of said cylinder being slightly less than the internal dimension B of said container, and the axial length of said cylinder being slightly less than the internal dimension A; said body being oriented with its said axis in a generally horizontal plane and the lateral periphery of said body thereby lying closely adjacent to the internal walls of said container; and wherein said body carries permanent magnet means toward one axial end thereof, said magnet means being oriented to provide a pair of opposite magnetic poles toward alternate sides of the axis of said cylinder; whereby said externally applied rotating magnetic field alternately attracts and repels said magnetic poles of said body, and whereby said body by virtue of the constraints imposed by said proximate cell walls rotates about its said axis in response to said attraction and repulsion.

2. Apparatus in accordance with claim 1, wherein said stirrer body carries agitation surfaces which are parallel to said body axis, whereby rotation of said body drives said surface through said sample to enhance agitation of said fluid sample.

3. Apparatus in accordance with claim 2, wherein said surfaces are defined at longitudinally extending notches formed into said cylinder.

4. Apparatus in accordance with claim 2, wherein said permanent magnet means comprises a bar magnet oriented with its opposite poles lying along a major diameter of said cylinder.

5. An optical absorption cell system for use in optical absorption spectroscopy, comprising in combination:

a non-magnetic container for fluidic samples to be subject to optical absorption analysis, said container having a generally rectangular transverse cross-section of interior dimensions A × B, where A is relatively large compared with B;

means for applying a rotating magnetic field at said container, the magnetic pole sources of said field rotating in a generally horizontal plane beneath said container;

a generally cylindrical magnetic stirrer body being positioned at the bottom of said container, said body having a major diameter slightly less than dimension B, and an axial length slightly less than dimension A; the axis of said body being horizontally oriented, and the lateral periphery of said body thereby lying proximate to the interior walls of said container; said body carrying permanent magnet means towards one end thereof, providing at least a pair of opposite magnetic poles toward opposite sides of the axis of said cylinder; whereby said applied rotating magnetic field alternately attracts and repels said magnetic poles of said body, whereby said body by virtue of the constraints of said proximate walls unidirectionally rotates about its said axis.

6. Apparatus in accordance with claim 5, wherein said stirrer body carries agitation surfaces which are parallel to said body axis, whereby rotation of said body drives said surface through said sample to enhance agitation of said fluid sample.

7. Apparatus in accordance with claim 6, wherein said surfaces are defined at longitudinally extending notches formed into said cylinder.

8. Apparatus in accordance with claim 6, wherein said permanent magnet means comprises a bar magnet oriented with its opposite poles lying along a major diameter of said cylinder.

9. Apparatus in accordance with claim 5, wherein the interior of said container is curved at the bottom thereof to approximately mate with the said generally cylindrical form of said stirrer body.

* * * * *

UNITED STATES PATENT AND TRADEMARK OFFICE
CERTIFICATE OF CORRECTION

PATENT NO. : 3,997,272

DATED : December 14, 1976

INVENTOR(S) : Kenyon P. George

It is certified that error appears in the above-identified patent and that said Letters Patent are hereby corrected as shown below:

Column 1, line 46: After " "micro cells" " insert --or "semi-micro cells"--.

Column 2, line 24: Delete "towards poles".

Signed and Sealed this

***First* Day of *August 1978***

[SEAL]

*Attest:*

DONALD W. BANNER

RUTH C. MASON
*Attesting Officer*

*Commissioner of Patents and Trademarks*